UNITED STATES PATENT OFFICE 2,146,755

DYE COMPOSITIONS

James G. McNally and John A. Leermakers, Rochester, N. Y., assignors to Eastman Kodak Company, Rochester, N. Y., a corporation of New Jersey No Drawing. Application August 25, 1936, Serial No. 97,816

15 Claims. (Cl. 8—91)

This invention relates to stable finely divided suspensions or dispersions of dyes insoluble or difficultly soluble in water. More particularly it relates to dispersions of such dyes which are suitable for the dyeing, printing, stenciling or otherwise coloring of materials made of or containing organic derivatives of cellulose.

The term "organic derivatives of cellulose" as used herein is intended to include such cellulosic materials as are characterized by an indifferent affinity for the usual cotton or wool dyes. Typical organic derivatives of cellulose include the hydrolyzed as well as the unhydrolyzed organic acid esters of cellulose such as cellulose acetate, cellulose propionate or cellulose butyrate and the hydrolyzed as well as the unhydrolyzed mixed organic acid esters of cellulose such as cellulose acetate propionate, cellulose acetate butyrate and cellulose ethers, such as methyl cellulose, ethyl cellulose or benzy cellulose.

Dyes may be classified broadly as being soluble or insoluble in water. In general, it may be stated that soluble dyes are applied directly from aqueous solution to the material undergoing dyeing, without the necessity of agents promoting solubility, whereas insoluble dyes require such agents to enable them to effect coloration. Various substances have been developed for this purpose. These substances commonly known as dispersing or solubilizing agents, as their name implies, disperse or solubilize, or both disperse and solubilize, the dye in the aqueous dye-bath thus enabling it to effect coloration. Our invention is directed to this art. In some instances, a dye may possess such solubility that it becomes difficult to classify it as insoluble or difficultly soluble but yet it may be of such insufficient solubility that the use of a dispersing or solubilizing agent is desirable.

The expression "insoluble dye" as used in the claims is intended to include not only dyes which are insoluble in water but also dyes of the character just mentioned which are of such insufficient or difficult solubility in water that the use of a dispersing or solubilizing agent is desirable.

While, as above indicated, it is known to prepare pastes or suspensions of dyes employing various dispersing agents difficulty has been encountered in preparing stable preparations, suitable for marketing, for example, in which the dispersed material would not separate out upon storage or standing. This separation of the dispersed material would not be so serious if the separated dye could be readily dispersed again but ordinarily the solid material settles on the bottom of the container in the form of a solid cake which is unsuited for further treatment. Where such flocculation occurs in the case of a dye dispersion the speed of dyeing is impaired with a corresponding decrease in the efficiency of the dispersion as a dyeing agent. Our invention is directed to the preparation of dye dispersions or suspensions whereby the difficulties noted in connection with previous preparations are overcome or greatly minimized.

Examples of materials of some use as dispersing or solubilizing agents, particularly, for water insoluble cellulose acetate dyes, are soaps, sulfonated oils, waste cellulose sulfite liquor, straw extract, molasses, pine oil, and aromatic sulphonic acid compounds such as furfural-naphthalene sulfonic acid and furfural-benzene sulphonic acid. While the afore-mentioned dispersing agents are of some value, few of them are of general use as dispersing agents for all types of cellulose acetate dyes. Thus, certain of these dispersing agents are useful in dispersing anthraquinone type dyes suitable for dyeing cellulose acetate, but of less value when applied in cellulose acetate dyeing operations involving azo type dyes. Dye dispersions prepared by employing soaps often flocculate on standing at elevated temperatures and as noted such flocculation is undesirable as it impairs the speed of dyeing. Again, certain of the dispersing agents mentioned suffer from the disadvantage that large quantities of the dispersing agent are necessary as compared to the amount of dye dispersed.

It is an object of our invention to provide improved dye compositions. A further object is to prevent or retard the separation of dyes from pastes, suspensions or dispersions of the same. Another object is to provide an improved composition of matter containing a finely divided dye, a dispersing agent and a wetting agent. Still further objects are to provide a process of preparing the improved dye compositions and a process of dyeing, printing, stenciling or otherwise coloring materials made of or containing organic derivatives of cellulose therewith.

We have discovered that the water soluble salts of polymeric carbohydrate esters of polycarboxylic acids, that is compounds in which one of the carboxyl groups of the acid is esterified with a hydroxyl group of the polymeric carbohydrate and the other carboxyl group or groups are free, constitute an unusually valuable class of dispersing agents. Advantageously, the polycarboxylic acid is a dicarboxylic acid, for example, phthalic or succinic acid. The water soluble dispersing agents of our invention may be, for example, in the form of an alkali salt, as sodium or potassium, an ammonium salt or a salt of an organic base such as ethanolamine, triethanolamine, pyridine or quinoline. Incompletely neutralized salts of polycarboxylic acids may likewise be employed in forming the said water soluble dispersing agents.

The polymeric carbohydrate employed in the preparation of the dispersing agents of the invention may be, for example, a cellulosic material, which includes not only esterifiable materials consisting principally of cellulose but also cellulose derivatives such as cellulose acetate or other cellulose fatty acid esters, or a starch material. It will be understood that while our invention will be described more particularly with respect to compositions containing a dispersing agent prepared from a cellulose or starch material the invention is not limited thereto as water soluble dispersing agents prepared from other polymeric carbohydrates may be employed. Generally speaking a dispersing agent prepared from a cellulosic or starch material is preferred because of their suitability and the ready availability of cellulosic or starch materials.

The dispersing agents employed in the preparation of the dye compositions of our invention may, in the main, be represented by the general formula:

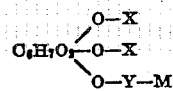

in which

represents a C₆ unit of the polymeric carbohydrate, stripped of the hydrogen atoms attached to oxygen, X represents hydrogen, an acyl, alkyl, hydroxyalkyl, or a Y—M group, Y represents a polycarboxylic acid group and M represents either NH₄, Na, K, Li, Rb, Cs, or an organic base.

Advantageously the polymeric carbohydrate can be cellulose or starch, the acyl group acetyl, propionyl or butyryl, the alkyl group methyl or ethyl, the hydroxyalkyl group —CH₂OH, —CH₂CH₂OH, or —CH₂CH₂CH₂OH and the polycarboxylic acid group phthalyl or succinyl. It will be understood, however, that our invention, with regard to the components forming the dispersing agent, is not limited to those specifically named above as others can be employed. Thus the polycarboxylic acid group can also be derived from malonic, tartaric and citric acids, for example. Similarly the alkyl group may be a higher alkyl group than those specifically named such as propyl or butyl.

As examples of the dispersing agents of our invention the water soluble salts of the following compounds may be mentioned:

Cellulose phthalate
Cellulose succinate
Cellulose mono-acetate diphthalate
Cellulose diacetate mono-phthalate
Cellulose diacetate mono-succinate
Cellulose acetate propionate succinate
Cellulose tri-phthalate
Starch acetate succinate
Starch acetate phthalate
Starch phthalate and
Starch succinate.

As previously indicated, the water soluble salts may, for example, be the alkali salts such as sodium or potassium, the ammonium salt or salts of organic bases such as ethanolamine, triethanolamine or pyridine.

From the foregoing it will be seen that the water soluble polymeric carbohydrate dispersing agents of our invention are characterized by the presence of a free carboxyl group in salt form, attached to the polymeric carbohydrate through an ester linkage.

In order that the invention may be more fully understood and illustrated the preparation of various compounds suitable for use as the dispersing agents of the invention is described hereinafter.

Water soluble salts of a cellulosic ester of a polycarboxylic acid may be prepared as described in Malm and Waring application, Serial Number 380,252 filed July 22, 1929 (now United States Letters Patent No. 2,093,462, dated September 21, 1937). Both aliphatic and aromatic dicarboxylic acids have been found suitable. As illustrative of the aliphatic dicarboxylic acids that may be employed succinic acid is especially suitable although a homologue such as glutaric acid may be used. Among the aromatic dicarboxylic acids, phthalic acid is particularly suitable, however other aromatic dicarboxylic acids having similar chemical properties are suitable.

Briefly in accordance with the process described in the said Malm and Waring application a cellulosic material is treated at elevated temperature, 60–95° C., for example, with a mixture of a polycarboxylic acid anhydride, such as phthalic anhydride, and an organic base such, for example as pyridine or quinoline. Upon completion of the esterification, or when the desired degree of esterification has been obtained the reaction mass is precipitated in a non-solvent of the ester which has been formed. Depending on the non-solvent employed the ester will be obtained in its free acid or salt form. Where the ester is obtained as a salt of an organic base, it may be converted to the free acid form by treatment with a suitable acid. Acetic acid may be employed for this purpose but mineral acids such as sulfuric acid or hydrochloric acid also are suitable.

Salts of inorganic or organic bases may be prepared by appropriate treatment of the free acid form of the cellulosic ester compound obtained as above. For example, by treating cellulose phthalate, from which the organic base has been removed, with sodium hydroxide, cellulose sodium phthalate, which is water soluble, will be obtained. The preparation of similar compounds of the esters forming the dispersing agents of the invention readily suggests itself to those familiar with the art.

Referring more particularly to the water soluble salts of succinic acid esters of cellulose these may be prepared as described in Malm and Waring application, Serial No. 627,150 filed July 30, 1932 (now United States Letters Patent No. 2,093,464, dated September 21, 1937). These water soluble salts include the sodium, potassium and ammonium salts and constitute suitable dispersing agents for employment in the present invention.

Ethanolamine salts of polycarboxylic acid esters of cellulose may be prepared by treating a solution of the ester with a solution of an ethanolamine. The preparation of these salts is more particularly described in U. S. Letters Patent 1,969,741. Some of the ethanolamine salts of dicarboxylic acid esters of cellulose useful as dispersing agents and which may be prepared in accordance with said Letters Patent include:

Cellulose triethanolamine phthalate
Cellulose acetate triethanolamine phthalate
Cellulose triethanolamine succinate
Cellulose acetate triethanolamine succinate
Cellulose triethanolamine diglycollate
Cellulose diethanolamine phthalate
Cellulose monoethanolamine phthalate
Cellulose acetate diethanolamine succinate
Cellulose acetate propionate triethanolamine phthalate.

The preparation of cellulose esters containing groups of dicarboxylic acids having heterogeneous linkages is described in U. S. Letters Patent 2,024,238. The water soluble salts of these compounds are included within the scope of the dispersing agents of the invention.

In accordance with the process described in said Letters Patent 2,024,238 a cellulosic material is subjected to treatment at a temperature preferably approximating 90–110° C. with an anhydride of a heterogeneously linked dicarboxylic acid and an organic base such as pyridine. Upon completion of the esterification, or when the desired degree of esterification has been obtained the reaction mass may be precipitated by pouring the reaction mass into a dilute aqueous mineral acid, which will remove any combined organic base or into an organic non-solvent for the ester such as an alcohol or an ether, for instance isopropyl ether.

By treating the free acid ester with an organic base such as ethanolamine or an inorganic base such as sodium, potassium or ammonium hydroxide, a salt soluble in water may be obtained. The compounds which are listed immediately hereinafter may be prepared as described in said Letters Patent No. 2,024,238. The dispersing agents of the invention include the water soluble salts of these compounds; said water soluble salts may be prepared as indicated in said Letters Patent or any other suitable way.

Cellulose acetate diglycollate
Cellulose acetate dilactate
Cellulose acetate dihydracrylate
Cellulose diglycollate
Cellulose dilactate
Cellulose acetate propionate diglycollate
Cellulose ethyl ether diglycollate
Cellulose acetate diglycollate thiodiglycollate
Cellulose acetate diglycollate dilactate
Cellulose thiodiglycollate
Cellulose acetate thiodiglycollate, and
Cellulose acetate thiodilactate.

The preparation of inorganic salts of cellulose dicarboxylates is more particularly described in Malm and Waring application Serial No. 627,149, filed July 30, 1932 (now United States Letters Patent No. 2,093,463, dated September 21, 1937) and the inorganic salts of the above compounds may be prepared as described therein.

While the dispersing agents of our invention are fully described and illustrated in the foregoing they may likewise be prepared as described in British Patents Nos. 410,118, 410,125 and 410,126.

Again, while the above noted patents and applications do not specifically disclose the preparation of water soluble salts of polymeric carbohydrate esters of polycarboxylic acids other than for cellulose, the corresponding starch compounds may be prepared by the general method of preparation described therein. To illustrate, a pyridine salt of starch acetate phthalate may be prepared by reacting phthalic anhydride with starch acetate in the presence of pyridine, while starch acetate propionate succinate may be prepared by reacting starch acetate propionate with succinic anhydride in the presence of pyridine.

It should be noted that the dispersing agents of our invention are not definite compounds in the sense that they necessarily contain fixed proportions of the various elements or substituents entering into their make up but on the contrary they may contain varying proportions of the various substituents. Thus while the esterified polycarboxylic acid may be present in proportions corresponding to say one molecular weight per molecule of the polymeric carbohydrate it may be present in greater or lesser amount. To illustrate, the phthalyl content of a phthalyl dispersing agent may correspond to that of a monophthalate or to that of a diphthalate, although these are not to be considered as limits as the phthalyl content may be considerably less than that corresponding to a mono-phthalate or greater than that corresponding to a diphthalate. Similarly the succinyl content may vary from a relatively low percentage to its maximum.

The dispersing agents of our invention are of advantage in that comparatively small amounts are required to disperse large amounts of dye. Further, dye dispersions or suspensions prepared in accordance with the invention do not flocculate on standing at elevated temperatures and are stable in soap solutions and in solutions containing inorganic salts even in large amount.

The dispersing agents of the invention may be employed to prepare self-dispersing dye pastes or powders or they can be added directly to the dyebath to disperse and solubilize the previously finely divided insoluble dye. To prepare self-dispersing pastes the dye and dispersing agent are intimately ground in the presence of a suitable liquid, water, for example, to a paste form with or without diluents or conditioning agents. If the powdered form of the solubilized dye is desired, the paste so prepared is permitted to dry, after which it may be ground to a powder.

We have found that in some cases after standing in a dry atmosphere, powders, particularly those which have been prepared from pastes of dye and dispersing agent, do not easily disperse in water, although they dissolve readily in soap solutions. The difficulty just noted may be avoided, however, by the addition of small quantities of hygroscopic materials, such as glycerine or acetamide, which prevent complete desiccation of the powder. Conveniently, the hygroscopic material may be added to the dye paste from which the powder is to be formed. Powders obtained from such pastes appear dry, run freely and readily disperse themselves in water. The hygroscopic agent may likewise be added in proper amount to the dye and anhydrous powdered dispersing agent and the mixture ground to a powder but this latter method is not considered as desirable as the former.

We have also found that certain selected solid materials such as sodium sulfate, sodium chloride, sugar and urea can be added to the pastes of dye and dispersing agent, either with or without conditioning agents, and that these diluents do not affect the efficiency of the dispersing agent. These diluents may also be added to a dried paste of dye and dispersing agent and the whole ground together to a powder of the desired fineness.

The water-soluble dispersing agents of our invention, while suitable for the dispersion of finely divided, insoluble or difficultly soluble dyes in general, are of especial value for solubilizing insoluble or difficultly soluble dyes suitable for dyeing materials made of or containing organic derivatives of cellulose.

The dispersing agents of our invention may be employed in conjunction with other dispersing agents in preparing the dye pastes or powders. Similarly the dye pastes or powders prepared employing the dispersing agents of our invention may be added to aqueous solutions of other dispersing agents such as soap, salts of sulfonic acids, and sulfonated olive oil.

The amount of dispersing agent employed to suspend or disperse the insoluble dyes may be varied over wide limits depending on the nature of the dye to be dispersed. As little as one part by weight of dispersing agents to 30 parts of dye may be effective in keeping the dye in dispersion or suspension. Larger ratios of dispersing agent to dye as 1 to 10 or even more may, however, be used to advantage in some cases.

Our invention will now be illustrated in connection with the preparation of the new dye dispersions or suspensions together with their application in the dyeing of organic derivatives of cellulose, particularly cellulose acetate materials such as cellulose acetate silk.

Example I

A paste is prepared by grinding 100 grams of orthomethoxy p-nitro benzene azo-diphenylamine with 10 grams of the ammonium salt of cellulose mono-acetate diphthalate contained in 200 ccs. of water. Half of the paste thus prepared is added to 60 liters of water, preferably soft water, and the resulting mixture heated to a temperature approximating 45–55° C. 2 kilograms of cellulose acetate taffeta silk are added to the dye bath after which the temperature is gradually raised to 80–85° C. and the silk worked for two hours at this latter temperature. Upon completion of the dyeing operation, the goods are removed, washed, rinsed and dried. The cellulose acetate silk is dyed a bright orange-red shade.

The remaining half of the paste prepared above is allowed to dry at room temperature and is then ground in a ball mill or in any other suitable manner to a powder of a fineness of 150 mesh. The resulting powder is added to 60 liters of soft water and dyeing conducted as described above in connection with the paste form. The cellulose acetate silk is similarly dyed a bright orange-red shade.

Example II 10 grams of cellulose diacetate monophthalate are neutralized with a potassium hydroxide solution and the resulting mixture diluted to 200 ccs. by the addition of water. 100 grams of 1.4-dimethylaminoanthraquinone are added and a paste is formed, for example, by grinding in a ball mill. Half of the paste thus prepared is added to 60 liters of soft water and the temperature of the resulting mixture is raised to about 45–55° C. 2 kilograms of cellulose acetate silk are added to the dye bath, the temperature gradually raised to 80–85° C. and the silk worked for two hours at this latter temperature. Upon completion of the dyeing operation the cellulose acetate silk is removed, washed, rinsed and dried. The cellulose acetate silk is dyed a bright sky blue shade.

The other half of the paste prepared above is dried and ground to a powder. The powder formed can be employed to dye cellulose acetate silk in exactly the same manner as described for the paste form and similarly dyes the cellulose acetate silk a bright sky blue shade.

Example III 25 grams of sodium starch acetate succinate are neutralized with ethanolamine and the whole diluted to 100 ccs. with water. 100 grams of p-dimethylaminobenzene azo phenylmethylpyrazolone are added and the resulting mixture made into a paste. Half of this paste is used to dye two kilograms of cellulose acetate silk in the same manner described in Examples I and II. The material is dyed a red shade.

The remainder of the paste is dried and powdered. Cellulose acetate silk dyed from an aqueous suspension of the powder at 75° C. is likewise dyed a red shade.

Example IV 20 grams of the triethanolamine salt of cellulose monosuccinate are dissolved in 200 ccs. of water. 100 grams of o-methoxy benzene azo dihydrodimethylresorcinol are added and the resulting mixture ground to a paste. Half of this paste is added to 30 litres of soft water and 10 kilograms of cellulose acetate silk are added to the dyebath thus formed and dyed at a temperature of 80–85° C. for one hour. On completion of the dyeing operation the cellulose acetate silk is removed and subjected to the customary washing, rinsing and drying operations. The material thus dyed has a bright green-yellow shade.

The remaining paste is dried and ground to a powder. This powder is added to 30 liters of soft water and 10 kilograms of cellulose acetate silk cloth are added and dyed in the usual manner. The cloth is dyed a bright green-yellow shade.

Example V 20 grams of the mono potassium salt of cellulose monoacetate diphthalate are dissolved in 100 ccs. of water. 100 grams of 1-hydroxy 4-aminoanthraquinone are added and the resulting mixture ground to a paste. Half of the paste thus prepared is dispersed in 60 liters of soft water while the remaining half is dried and powdered and likewise dispersed in 60 liters of soft water. 10 kilograms of cellulose acetate silk fabric are added to each of the dyebaths and dyed at a temperature approximating 85° C. for two hours in accordance with the usual dyeing practice. When dyeing is complete the fabric is removed, washed, rinsed and dried. The cellulose acetate is found to be dyed a bright pink shade.

Example VI 10 grams of potassium cellulose triphthalate are dissolved in 100 ccs. of water. 100 grams of p-nitrobenzene azo diphenylamine and 10 grams of glycerin are added to this solution and the resulting mixture made into a paste. The paste thus formed is dried and ground to a powder. This powder is self-dispersing after long standing in a dry atmosphere.

50 grams of the powder are added to 60 liters of soft water and 2 kilograms of cellulose acetate fabric are entered and dyed at a temperature of about 85° C. for two hours. Upon completion of the dyeing operation the material is washed, rinsed and dried and is found to be dyed an orange shade.

Example VII 10 grams of sodium cellulose diacetate monophthalate and 10 grams of acetamide are dissolved in 200 ccs. of water. 100 grams of 1.4-di($\beta$-hydroxyethylamino) anthraquinone are added and the resulting mixture made into a paste which is dried and ground to a powder. Cellulose acetate silk is dyed employing the proportions and conditions disclosed in Example VI. The material is dyed a deep blue shade.

Example VIII 10 grams of ammonium cellulose monoacetate diphthalate and 10 grams of glycerin are dissolved in 200 ccs. of water. 100 grams of o-chlorobenzene azo p-dimethyl aniline are added and the mixture formed thereby ground to a paste. The paste is dried and then ground with 100 grams of sodium sulfate to a powder. 100 grams of the powder are dissolved in 60 liters of water and two kilograms of cellulose acetate are entered and dyed at a temperature of 85° C. for approximately two hours. The cellulose acetate is dyed a bright orange-yellow shade.

Example IX 10 grams of the ethanolamine salt of cellulose acetate succinate are dissolved in 200 ccs. of water and 100 grams of cane sugar and 100 grams of m-nitro benzene azo p-dimethylaniline are added to this solution. The mixture is ground to a paste and then dried and ground to a powder. 100 grams of the powder will dye two kilograms of cellulose acetate silk cloth a bright orange-yellow color using the temperature and conditions set forth in Example VIII.

Example X

A paste is prepared by dissolving 10 grams of potassium cellulose mono-acetate di-phthalate and 10 grams of a soap such as sodium oleate or sodium sulphoricinoleate in 200 ccs. of water, adding 100 grams of 1,4-diamino anthraquinone and grinding the resulting mixture. Half of this paste is added to 30 liters of soft water and four kilograms of cellulose acetate silk are added to the dye bath, the temperature gradually raised to about 85° C. and the silk worked at this temperature for about two hours. Upon completion of the dyeing operation the silk is removed and subjected to any treatment desired. Cellulose acetate silk is dyed a purple shade fast to washing and rinsing by the above dyeing operation.

The powder prepared by allowing the remainder of the paste to dry and then grinding similarly dyes cellulose acetate a purple shade using the conditions above specified.

Example XI 10 grams of potassium cellulose mono-acetate diphthalate and 10 grams of the sodium salt of isopropyl naphthalene sulfonic acid dissolved in 200 ccs. of water are mixed with 100 grams of 1.4-dimethylaminoanthraquinone and ground to a paste. The paste is dried and ground to a powder. Employing the proportions and conditions specified in Example X, cellulose acetate silk is dyed a blue shade fast to washing and rinsing from an aqueous dye bath of this powder.

Example XII 10 grams of potassium cellulose mono-acetate diphthalate and 10 grams of sulfonated olive oil dissolved in 100 ccs. of water are mixed with 100 grams of p-dimethylamino benzene azo naphthalene and made into a paste. The paste is added to 60 liters of soft water and four kilograms of cellulose acetate cloth are added, the temperature gradually raised to 85° C. and the cloth worked at this temperature for two hours. Upon completion of the dyeing operation the cloth may be washed, rinsed and dried. The cellulose acetate is dyed a golden yellow shade.

Example XIII 100 grams of a powder prepared as in Example I are added to 2 liters of a 6% soap solution. The temperature of the soap solution is raised to 85° C. by live steam, for example, and the solution is then diluted to 50 liters by the addition of soft water having a temperature of 85° C. Cellulose acetate goods may be dyed in accordance with the usual dyeing practice from a dye bath so prepared. By employing the dispersion agents of our invention, cellulose acetate silk may be dyed in the presence of soap solutions without flocculation and with excellent speed.

Example XIV 10 grams of potassium cellulose mono-acetate diphthalate are dissolved in 100 ccs. of water and ethyl alcohol is added to the solution with stirring until the salt is precipitated in a finely divided form. The salt is then washed with alcohol by decantation after which it is drained free of the alcohol. 100 grams of p-nitro benzene azo dimethylaniline are ground with this salt until a finely divided powder is obtained. The resulting powder is added to 100 liters of soft water and 4 kilograms of cellulose acetate fabric are added and dyed at a temperature of 75° C. for two hours in the known manner. Upon completion of the dyeing operation the cloth is removed, washed, rinsed and dried and is dyed a bright orange shade.

Example XV 100 grams of o-nitrobenzene dimethylaniline are dissolved in 3 liters of acetone and the solution is added to 100 liters of water containing 50 grams of sodium cellulose acetate succinate. The resulting mixture or solution is stirred and heated to a temperature of 85° C. Five kilograms of cellulose acetate silk are added and dyed at a temperature of 85° C. for two hours, after which it is removed, washed, rinsed and dried. The cellulose acetate silk is dyed an orange shade.

Dyeing can be satisfactorily conducted either with or without the presence of wetting agents. We have found, however, that the addition of "Calgon", a soluble form of sodium metaphosphate, to the dyebath is advantageous in that it aids wetting of the material undergoing dyeing with the dye thereby facilitating the speed of dyeing. The dyeing operations above described were carried out employing 10% (by weight) of "Calgon" on the dye. Varying proportions of the wetting agent can, of course, be employed but the proportion just mentioned is generally advantageous.

In some instances it may be desired to conduct the dyeing operation in a dyebath of such alkalinity that a water soluble salt of a polymeric carbohydrate ester of a polycarboxylic acid would be formed upon the mere addition of a polymeric carbohydrate ester of a polycarboxylic acid in free acid form to the dyebath—in which case the dispersing agent would be formed in situ—and it is to be understood that this is included within the scope of our invention.

We claim:

1. A stable composition of matter suitable for the dyeing of organic derivatives of cellulose comprising an insoluble dye and as a dispersing agent therefor a water soluble salt selected from the group consisting of the water soluble salts of cellulose and starch esters of dicarboxylic acids.

2. A stable composition of matter suitable for the dyeing of organic derivatives of cellulose comprising an insoluble dye and as a dispersing agent therefor a water soluble salt of a cellulose phthalate.

3. A stable composition of matter suitable for the dyeing of organic derivatives of cellulose comprising an insoluble dye and as a dispersing agent therefor a water soluble salt of a cellulose succinate.

4. A stable composition of matter comprising an insoluble dye and as a dispersing agent therefor a water soluble salt selected from the group consisting of the water soluble salts of cellulose and starch esters of dicarboxylic acids.

5. A stable composition of matter comprising an insoluble dye and as a dispersing agent therefor a water soluble salt of a polymeric carbohydrate having the general formula:

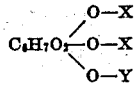

wherein X represents hydrogen, an acyl group, an alkyl group, a hydroxyalkyl group or a polycarboxylic acid having one of its carboxyl groups esterified with a hydroxyl group of the polymeric carbohydrate and Y represents a polycarboxylic acid having one of its carboxyl groups esterified with a hydroxyl group of the polymeric carbohydrate.

6. A stable composition of matter comprising an insoluble dye and as a dispersing agent therefor a water soluble salt of a polymeric carbohydrate having the general formula:

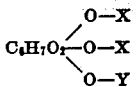

wherein X represents hydrogen, an acyl group, an alkyl group, a hydroxyalkyl group or a dicarboxylic acid having one of its carboxyl groups esterified with a hydroxyl group of the polymeric carbohydrate and Y represents a dicarboxylic acid having one of its carboxyl groups esterified with a hydroxyl group of the polymeric carbohydrate.

7. A stable composition of matter comprising an insoluble dye and as a dispersing agent therefor a water soluble salt of a polymeric carbohydrate having the general formula:

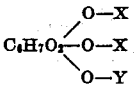

wherein X represents hydrogen, an acyl group, an alkyl group, a hydroxyalkyl group or phthalic acid having one of its carboxyl groups esterified with a hydroxyl group of the polymeric carbohydrate and Y represents phthalic acid having one of its carboxyl groups esterified with a hydroxyl group of the polymeric carbohydrate.

8. A stable composition of matter comprising an insoluble dye and as a dispersing agent therefor a water soluble salt of a polymeric carbohydrate having the general formula:

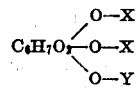

wherein X represents hydrogen, an acyl group, an alkyl group, a hydroxyalkyl group or succinic acid having one of its carboxyl groups esterified with a hydroxyl group of the polymeric carbohydrate and Y represents succinic acid having one of its carboxyl groups esterified with a hydroxyl group of the polymeric carbohydrate.

9. A stable composition of matter comprising an insoluble dye and as a dispersing agent therefor a water soluble salt of cellulose having the general formula:

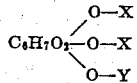

wherein X represents hydrogen, an acyl group, an alkyl group, a hydroxyalkyl group or a dicarboxylic acid having one of its carboxyl groups esterified with a hydroxyl group of cellulose and Y represents a dicarboxylic acid having one of its carboxyl groups esterified with a hydroxyl group of cellulose.

10. A stable composition of matter comprising an insoluble dye and as a dispersing agent therefor a water soluble salt of cellulose having the general formula:

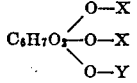

wherein X represents hydrogen, an acyl group, an alkyl group, a hydroxyalkyl group or phthalic acid having one of its carboxyl groups esterified with a hydroxyl group of cellulose and Y represents phthalic acid having one of its carboxyl groups esterified with a hydroxyl group of cellulose.

11. A stable composition of matter comprising an insoluble dye and as a dispersing agent therefor a water soluble salt of cellulose having the general formula:

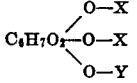

wherein X represents hydrogen, an acyl group, an alkyl group, a hydroxyalkyl group or succinic acid having one of its carboxyl groups esterified with a hydroxyl group of cellulose and Y represents succinic acid having one of its carboxyl groups esterified with a hydroxyl group of cellulose.

12. A stable dye preparation comprising a finely divided insoluble dye and a dispersing agent consisting of a water soluble salt selected from the class consisting of the water soluble salts of cellulose and starch esters of dicarboxylic acids.

13. A stable dye preparation comprising a finely divided insoluble dye and a dispersing agent consisting of a water soluble salt of a cellulose phthalate.

14. A stable composition of matter comprising an insoluble dye and as a dispersing agent therefor a water-soluble salt selected from the group consisting of water-soluble salts of cellulose and starch esters of a polycarboxylic acid.

15. A stable composition of matter comprising an insoluble dye and as a dispersing agent therefor a water-soluble salt selected from the group consisting of water-soluble salts of cellulose and starch esters of a polycarboxylic acid, said polycarboxylic acid being a member selected from the group consisting of acids containing 2 and 3 carboxylic groups.

JAMES G. McNALLY.
JOHN A. LEERMAKERS.